(12) United States Patent
Han et al.

(10) Patent No.: US 9,753,503 B2
(45) Date of Patent: Sep. 5, 2017

(54) MEMORY CARD SOCKET AND DATA PROCESSING DEVICE INCLUDING THE SAME

(71) Applicant: Samsung Electronics Co., Ltd., Suwon-si (KR)

(72) Inventors: Seok-Jae Han, Seongnam-si (KR); Dong-Min Kim, Hwaseong-si (KR); Jin-Hwan Choi, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/826,203

(22) Filed: Aug. 14, 2015

(65) Prior Publication Data

US 2016/0048178 A1    Feb. 18, 2016

(30) Foreign Application Priority Data

Aug. 14, 2014   (KR) .......................... 10-2014-0105709
Jul. 6, 2015    (KR) .......................... 10-2015-0095853

(51) Int. Cl.
  *G06F 1/16*    (2006.01)
  *G06F 1/18*    (2006.01)
  *G06K 7/00*    (2006.01)

(52) U.S. Cl.
  CPC ............ *G06F 1/183* (2013.01); *G06F 1/1613* (2013.01); *G06F 1/1679* (2013.01); *G06K 7/0026* (2013.01)

(58) Field of Classification Search
  CPC .......... H05K 5/03; H05K 5/0221; H05K 5/00; G06F 1/1613; G06F 1/1679; G06F 1/183; G06F 1/187; G06F 1/1662; G06F 1/16; G06F 1/18; G06F 1/181; G06F 1/1633; G06F 1/203; G06F 1/1626; G11B 33/124; G11B 33/125; G06K 7/0026
  USPC ....................................... 361/679.31, 679.58
  See application file for complete search history.

(56) References Cited

U.S. PATENT DOCUMENTS

| | | | |
|---|---|---|---|
| 4,887,188 A * | 12/1989 | Yoshida ............. | G06K 13/0806 361/679.31 |
| 6,374,315 B1 | 4/2002 | Okada et al. | |
| 6,385,040 B2 * | 5/2002 | Nabetani ............. | G06K 7/0082 361/679.31 |
| 6,990,026 B2 | 1/2006 | Yagi | |

(Continued)

FOREIGN PATENT DOCUMENTS

| | | |
|---|---|---|
| CN | 100375554 | 3/2008 |
| KR | 10-2010-0094801 | 8/2010 |
| KR | 10-1012911 | 2/2011 |

*Primary Examiner* — Anthony Haughton
*Assistant Examiner* — Ingrid Wright
(74) *Attorney, Agent, or Firm* — Muir Patent Law, PLLC

(57) ABSTRACT

A data processing apparatus includes an electronic device configured to store data and instructions; a memory card; and a memory card socket in which the memory card is inserted. In certain disclosed systems and methods, the memory card socket includes: an insertion portion through which the memory card is inserted; a lock portion formed around an edge of the insertion portion, and that is configured to control attaching and detaching of the memory card based on instructions received from the electronic device; and a main body including the insertion portion and the lock portion and configured to accommodate the memory card via the insertion portion.

18 Claims, 20 Drawing Sheets

(56) References Cited

U.S. PATENT DOCUMENTS

| | | |
|---|---|---|
| 7,309,258 B2 | 12/2007 | Anzai et al. |
| 7,438,599 B2 | 10/2008 | Uchida et al. |
| 7,508,659 B2 * | 3/2009 | Mambakkam ....... G06K 7/0013 |
| | | 349/65 |
| 7,601,031 B2 | 10/2009 | Tanaka et al. |
| 7,612,993 B1 * | 11/2009 | Takei ..................... H01R 13/64 |
| | | 361/679.31 |
| 8,037,229 B2 | 10/2011 | Zer et al. |
| 8,608,072 B2 | 12/2013 | Jeong et al. |
| 8,608,494 B2 | 12/2013 | Yang |
| 2005/0257017 A1 * | 11/2005 | Yagi ........................ G06F 21/79 |
| | | 711/163 |
| 2010/0169559 A1 * | 7/2010 | Harari ................. G06F 13/4068 |
| | | 711/103 |
| 2014/0199875 A1 | 7/2014 | Choi et al. |

* cited by examiner

MEMORY CARD SOCKET AND DATA PROCESSING DEVICE INCLUDING THE SAME

CROSS-REFERENCE TO RELATED APPLICATIONS

This application claims the benefit of priority under 35 U.S.C. §119 of Korean Patent Application No. 10-2014-0105709, filed Aug. 14, 2014, in the Korean Intellectual. Property Office, and Korean Patent Application No. 10-2015-0095853, filed Jul. 6, 2015, in the Korean Intellectual Property Office, the disclosures of both of which are incorporated herein by reference in their entirety.

BACKGROUND

The disclosed embodiments relate to a data processing apparatus, and more particularly, to a memory card socket controlled by software and a data processing apparatus including the memory card socket.

Since memory cards may easily store information of high capacity and are portable, memory cards may be widely used in electronic devices such as smartphones and computers. Memory cards capable of performing fast read and write operations and having larger storage capacities with smaller physical sizes have been developed and released in response to demands for high speed, small size, and high capacity. Generally, a memory card is used after being inserted into a memory card socket formed in an electronic device. However, if a memory card is suddenly removed or isolated from a memory card socket during operations of an electronic device by mistake of a user, a fatal problem may be caused in the electronic device, for example, stored data, may be damaged or errors may occur in a system of the electronic device.

The disclosed embodiments are directed to preventing or reducing the occurrence of one or more of the problems set forth above.

SUMMARY

In some exemplary embodiments, the present disclosure is directed to a data processing apparatus, comprising: an electronic device configured to store data and instructions; a memory card; and a memory card socket into which the memory card is inserted, wherein the memory card socket comprises: an insertion portion through which the memory card is inserted; a lock portion formed around an edge of the insertion portion and that is configured to control attaching and detaching of the memory card based on the instructions received from the electronic device; and a main body including the insertion portion and the lock portion and configured to accommodate the memory card Via the insertion portion.

In some embodiments, the present disclosure may further include: wherein when the electronic device issues a lock command instruction, the lock portion is maintained in a locked state in which the memory card is not removable the memory card socket, and when the electronic device issues an unlock command, the lock portion is maintained in an unlocked state in which the memory card is removable from the memory card socket.

In some embodiments, the present disclosure may further include: wherein when the lock portion is in the unlocked state and the memory card is mounted in the main body via the insertion portion, the electronic device automatically causes the lock portion to be in the locked state.

In some embodiments, the present disclosure may further include: wherein the lock portion comprises: a first element configured to attach and detach the memory card; and a second element controlled by the electronic device.

In some embodiments, the present disclosure may further include: wherein when the electronic device issues the lock command, the second element couples with the first element, and when the electronic device issues the unlock command, the second element decouples from the first element.

In some embodiments, the present disclosure may further include: Wherein at least one surface of the insertion portion has at least one color that is different from at least one color of the main body.

In some embodiments, the present disclosure may further include: wherein at least one surface of the insertion portion includes at least one light emitting device, and the at least one light emitting device emits different colored light based on the lock command and the unlock command.

In some embodiments, the present disclosure may further include: wherein the memory card comprises a notch at an edge thereof, and the lock portion is configured to engage with the notch.

In some embodiments, the present disclosure may further include: wherein data and instructions installed on the memory card include an operating system (OS) of the electronic device.

In some embodiments, the present disclosure may further include: wherein the electronic device further comprises: an embedded memory, wherein the memory card and the embedded memory are physically separated from each other, and the electronic device recognizes the memory card and the embedded memory logically as one storage space.

In other exemplary embodiments, the present disclosure is directed to a memory card socket mounted in an electronic device that comprises a controller, the memory card socket comprising: an insertion portion into which a memory card is inserted; a lock portion formed around an edge of the insertion portion, wherein the controller controls attaching and detaching of the memory card by the lock portion; and a main body including the insertion portion and the lock portion, wherein the main body accommodated the memory card via the insertion portion.

In some embodiments, the present disclosure may further include: wherein when the software issues a lock command, the lock portion maintains at a locked state causing the memory card to remain fixed at a location so as not to be detached from the memory card socket, and when the controller executes an unlock command, the lock portion maintains an unlocked state causing the memory card to be removable from the memory card socket.

In some embodiments, the present disclosure may further include: wherein the lock portion includes a rotary shaft and wherein the lock portion rotates within a predetermined angle range about the rotary shaft.

In some embodiments, the present disclosure may further include: wherein the main body further comprises: a latch unit, wherein the latch is engaged with a curved portion formed on the memory card.

In some embodiments, the present disclosure may further include: wherein the lock portion and the latch unit are formed on the same surface of the main body.

In some exemplary embodiments, the present disclosure is directed to a data processing apparatus, comprising: an electronic device including at least one processor; an embedded memory configured to store data and instructions; a memory card; a memory card socket, wherein the memory card socket comprises: an insertion portion through which the memory card is inserted; a lock portion formed around an edge of the insertion portion and that is configured to control attaching and detaching of the memory card based on instructions received from the electronic device.

In some embodiments, the present disclosure may further include: wherein the lock portion comprises: a first element configured to attach and detach the memory card; and a second element controlled by the electronic device.

In some embodiments, the present disclosure may further include: a main body including the insertion portion and the lock portion and accommodating the memory card via the insertion portion.

In some embodiments, the present disclosure may further include: wherein the memory card and the embedded memory are two physical storage devices, and the electronic device recognizes the memory card and the embedded memory as one logical storage space.

In some embodiments, the present disclosure may further include: wherein when the lock portion is in the unlocked state and the memory card is mounted in the main body via the insertion portion, the electronic device automatically causes the lock portion to change to the locked state.

BRIEF DESCRIPTION OF THE DRAWINGS

Exemplary embodiments will be more clearly understood from the following detailed description taken in conjunction with the accompanying drawings in which.

DETAILED DESCRIPTION

Figure 1A:
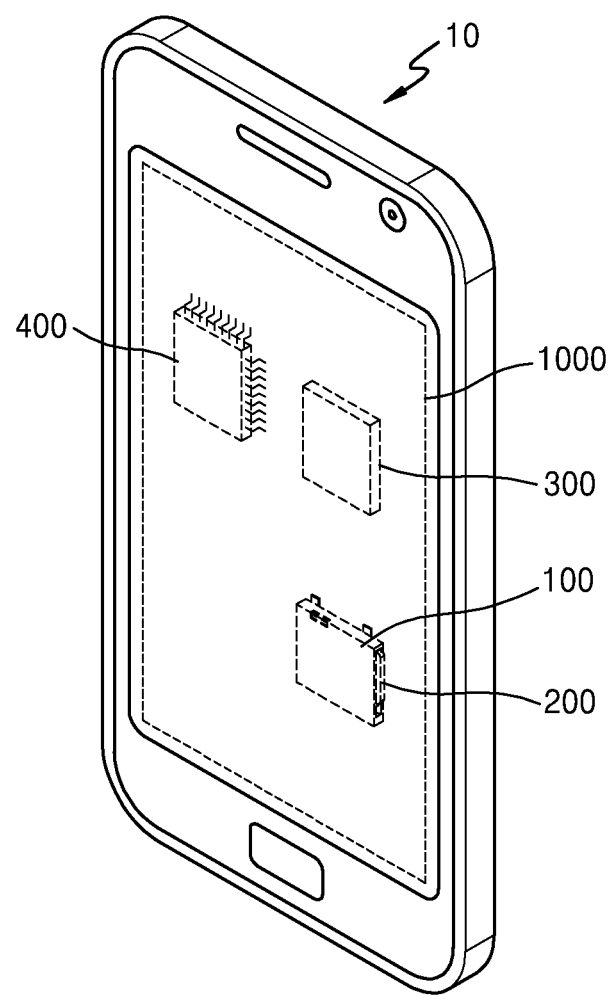
FIGS. 1A and 1B are schematic diagrams of an electronic device including a data processing apparatus according to certain exemplary embodiments.

The inventive concept will now be described more fully with reference to the accompanying drawings, in which exemplary embodiments are shown. The inventive concepts and features may, however, be embodied in many different forms and should not be construed as being limited to the exemplary embodiments set forth herein. In the drawings, the thicknesses of layers and regions are exaggerated for clarity. Like reference numerals in the drawings denote like elements.

It will be understood that, although the terms 'first', 'second', 'third', etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosed embodiments. For example, a first element may be designated as a second element, and similarly, a second element may be designated as a first element without departing from the teachings of the disclosure. In addition, in certain cases, even if a term is not described using "first," "second," etc. in the specification, it may still be referred to as "first" or "second" in a claim in order to distinguish difference claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise.

As used herein, a semiconductor device may refer, for example, to a device such as a semiconductor chip (e.g., memory chip and/or logic chip formed on a die), a stack of semiconductor chips, a semiconductor package including one or more semiconductor chips stacked on a package substrate, or a package-on-package device including a plurality of packages. These devices may be formed using ball grid arrays, wire bonding, through substrate vias, or other electrical connection elements, and may include memory devices such as volatile or non-volatile memory devices. As used herein, the terms memory device may refer to a semiconductor device that includes one or more memory arrays, and/or may also refer to a device such as a memory card, memory module, or solid state drive that includes one or more memory chips or package. The use of the terms "device" or "card" is not intended to limit the types of memory.

An electronic device, as used herein, may refer to these semiconductor devices or memory devices, but may additionally include products that include these devices, such as a hard drive including additional components, or a mobile phone, laptop, tablet, desktop, camera or other consumer electronic device, etc.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When an embodiment may be realized differently than that disclosed herein, a specified operation order may also be performed differently from the described order. For example, unless the context indicates otherwise, two operations described as being performed consecutively instead may be performed substantially simultaneously, or in an order opposite to the described order.

Variations from the shapes of the illustrations as a result of, for example, manufacturing techniques and/or tolerances, are to be expected. Thus, the disclosed embodiments should not be construed as limited to the particular shapes of regions as illustrated herein but are to include deviations in shapes that may result, for example, from manufacturing. As used herein, the term "and/or" includes any and all combinations of one or more of the associated listed items. Expressions such as "at least one of," When preceding a list of elements, modify the entire list of elements and do not modify the individual elements of the list.

Figure 1B:
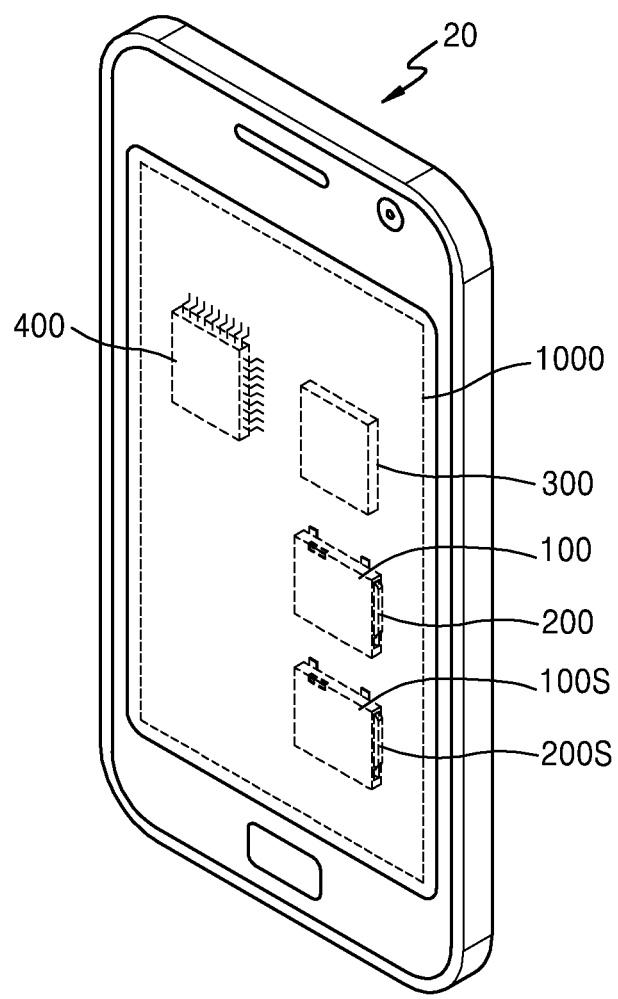

FIGS. 1A and 1B are schematic diagrams of electronic devices 10 and 20, respectively, wherein each of electronic devices 10 and 20 includes a data processing apparatus 1000 according to certain exemplary embodiments. Electronic devices, such as electronic device 10 and electronic device 20, may include, for example, one or more of: stationary and/or portable computers, whether having single processors, multiple processors, or multi-core processors; workstations; mainframes; servers; clients; television; stationary or portable telephones or telecommunications devices; personal digital assistants (PDA); tablet computers; scanners; pagers; cameras; musical devices; etc. Electronic devices, such as electronic device 10 or electronic device 20, and data processing apparatus 1000 may include one or more of the following: processors or central processing units (CPUs) configured to execute computer program instructions to perform various processes and methods consistent with certain disclosed embodiments; random access memory (RAM) and/or read only memory (ROM) configured to access and store information and computer program instructions associated with the disclosed embodiments; memory or other storage devices to store data and information; databases to store tables, lists, or other data structures; input/output (I/O) devices; interfaces; antennas; etc.

In some embodiments, such as those illustrated in FIGS. 1A and 1B, the data processing apparatus 1000 may include an embedded memory 400, a memory card 200, a memory card socket 100 for accommodating the memory card 200, and software that controls the memory card socket 100. In some embodiments, the software may manage the controller 300 to control the memory card socket 100.

Referring to FIG. 1A, a smartphone is shown as an example of the electronic device 10 that includes the data processing apparatus 1000. In some embodiments, the electronic device 10 may include an operating system (OS). The OS may be installed on a memory device, and one or more processors or CPUs included in the data processing apparatus 1000 may be configured to execute the instructions thereby causing the OS to operate on the data processing unit 1000. In some embodiments, the embedded memory 400 and the memory card 200 device may be classified as one or more of a built-in memory and an external memory. Either one may be referred to herein as a memory device.

For example, the built-in memory may be the embedded memory 400, and the external memory may be the memory card 200. The embedded memory 400 may be provided directly in the electronic device 10 to configure a system of the electronic device 10, and a program that may control operations of the electronic device 10, such as an OS, may be installed in the embedded memory 400. The memory card 200 may provide additional storage space to complement and/or supplement limitations in a storage capacity of the embedded memory 400 and may for example, store data such as pictures, videos, etc.

Generally, manufacturing costs of the embedded memory 400 with respect to per unit storage capacity may be greater than those of the memory card 200. In addition, once a storage capacity of the embedded memory 400 is determined during the manufacturing process of the electronic device 10, the storage capacity may not be expanded at a later time. Therefore, because the memory card 200 may be used for the same purpose as the embedded memory 400, a number of benefits may be obtained.

In one aspect, from the perspective of a manufacturer of the electronic device 10, there may be improved inventory control and management when there is a reduced use of electronic devices 10 having the embedded memory 400 with a fixed capacity. For example, if the electronic devices 10 having the embedded memory 400 of a relatively smaller capacity have been manufactured but consumers prefer electronic devices having the embedded memory 400 of a relatively greater capacity, there may be problems in manufacture and inventory control and management. However, if the memory card 200 is used to compliment and/or supplement the embedded memory 400, as disclosed herein, the manufacturer may be able to provide electronic devices having the memory capacity desired by consumers.

In another aspect, from the perspective of a manufacturer of the memory card 200, the manufacturer may sell memory cards 200 in the retail market, allowing consumers to purchase additional memory cards 200 to enable a greater capacity for electronic devices, such as electronic device 10 and electronic device 20, thereby expanding the market for memory cards.

In addition, OSs different from an OS installed on the embedded memory 400 may be installed on the memory card 200. For example, an OS A may be installed on the embedded memory 400 to operate the electronic devices, such as electronic device 10 or electronic device 20. In addition, an OS B may be installed on the memory card 200, thereby providing to the user another OS that is configured to operate the electronic devices, such as electronic device 10 or electronic device 20. As a result, in some exemplary embodiments, totally different execution environments may be provided to the user to operate a single electronic device 10.

However, in certain embodiments, to enable use of the memory card 200 for the same purpose as that of the embedded memory 400, the memory card 200 cannot be isolated during the operation of the electronic device 10 or electronic device 20. For example, after the memory card 200 is inserted in a memory card socket 100 provided in the electronic device 10, if the memory card 200 is isolated from the memory card socket 100 (e.g., removed from the memory card socket 100) during the operation of the electronic device 10, unexpected errors may occur, e.g., data stored in the memory card 200 may be damaged or an error may occur in the system of the electronic device 10. When a program, such as the OS controlling the electronic device 10, is installed on the memory card 200, there may be even greater or more numerous errors.

Therefore, when using the memory card 200 for the same purpose as the embedded memory 400, it may be beneficial to provide a restriction that allows the memory card 200 to be isolated only when the electronic device 10 is not using the data on the memory card 200.

According to certain exemplary embodiments, the data processing apparatus 1000 may control the memory card socket 100 via a controller 300. For example, the memory card socket 100 may allow for the state of the memory card 200 to be in a detachable state upon a user input of predetermined commands that are acted upon by, for example, software or instructions executing on the electronic device 10 or the data processing apparatus 1000. The software or instructions may be configured to allow the electronic device 10 or the data processing apparatus 1000 to manage the controller 300. During operation of the electronic device 10, for example, the electronic device 10 or the data processing apparatus 1000 may control the memory card socket 100 so that the memory card 200 may not be physically detachable (e.g., the memory card 200 may be locked in place when in a particular state), and thus, the memory card 200 may not be detached arbitrarily or accidentally. In such embodiments, the memory card 200 may be used for the same or similar purposes as the embedded memory 400.

Referring to FIG. 1B, a smartphone is shown as an example of the electronic device 20 that includes the data processing apparatus 1000. In addition, the electronic device 20 of FIG. 1B may further include an auxiliary memory card 200S and an auxiliary memory card socket 100S. In some embodiments, the auxiliary memory card socket 100S may not be controlled by the same software controlling the memory card socket 100, but may instead be controlled by different software. Further, in some embodiments, the auxiliary memory card 200S may not be used for the same purpose as the embedded memory 400 or the memory card 200, but may be used as a general memory card.

For example, the memory card 200 may provide a storage space in which a program controlling the electronic device 20, such as an OS, may be installed, together with the embedded memory 400, and the auxiliary memory card 200S may provide a storage space for storing more general types of data, e.g., photos, videos, etc., which may be less relevant to control of the electronic device 20. Other components may be the same as those of FIG. 1A, and thus, detailed descriptions thereof may be omitted.

Figure 2A:
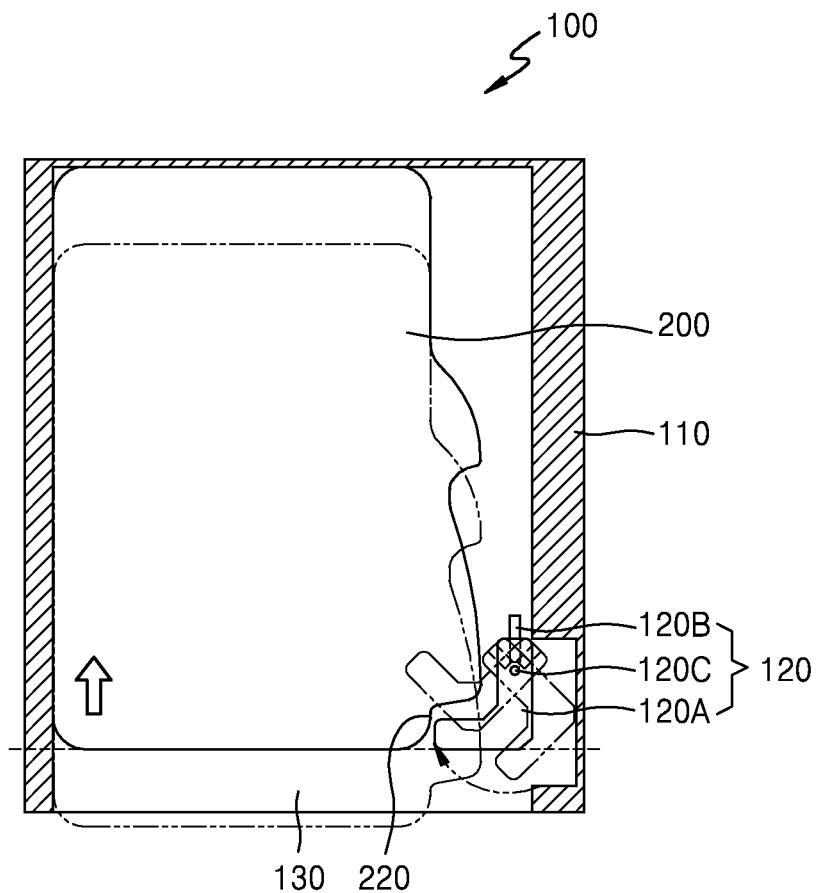
FIGS. 2A, 2B, and 2C are plan perspective views of a data processing apparatus according to certain exemplary embodiments.
Figure 2B:
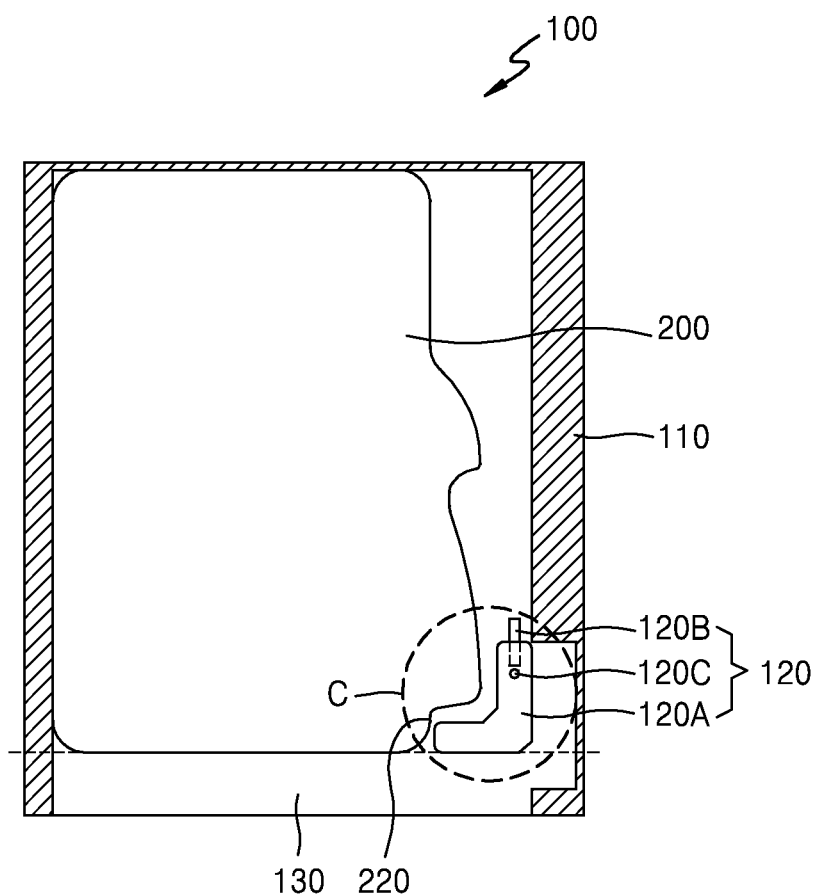
Figure 2C:
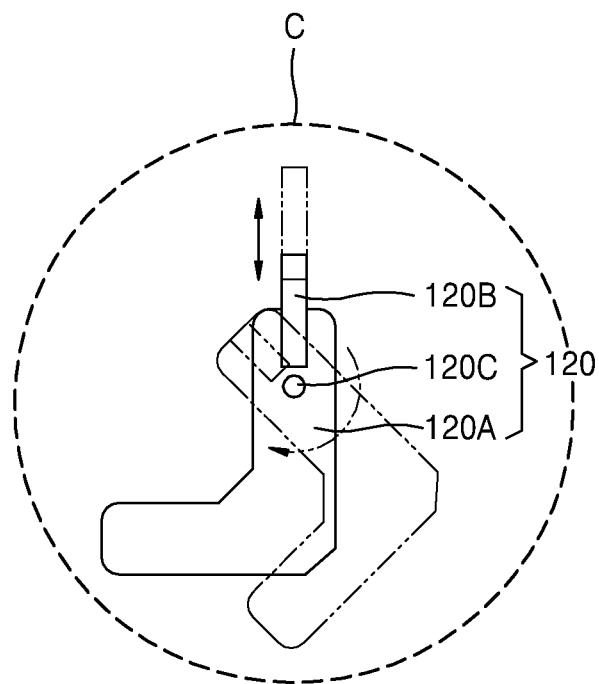

FIGS. 2A, 2B, and 2C are plan perspective views of a data processing apparatus according to some exemplary embodiments.

Figure 8:
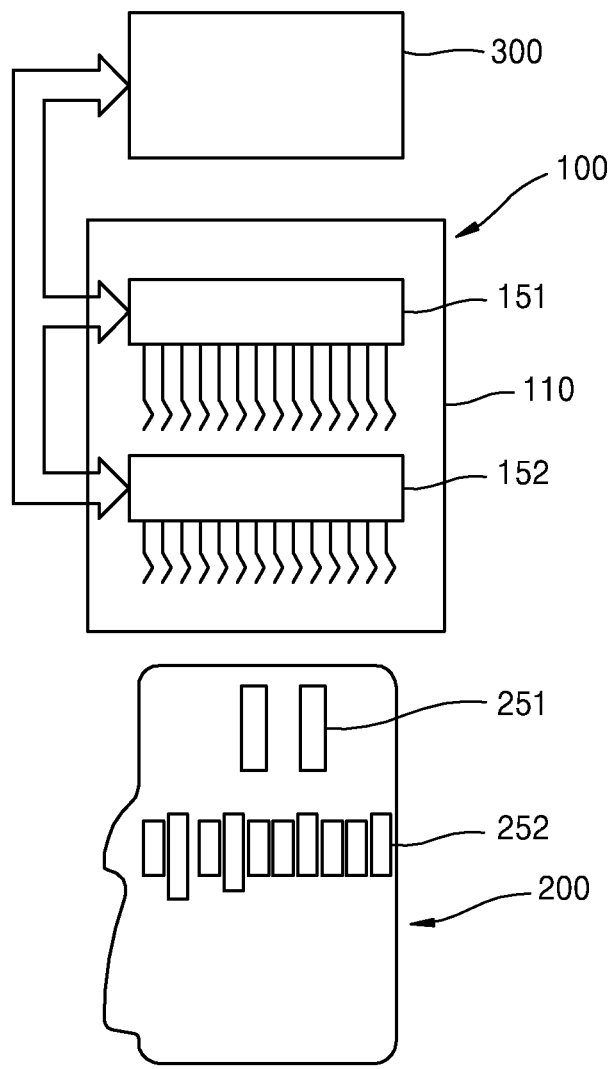
FIG. 8 is a schematic diagram of a memory card socket consistent with FIG. 7 and other exemplary embodiments.

Referring to FIG. 2A, exemplary embodiments of the memory card 200 and the memory card socket 100 forming the data processing apparatus 1000 are shown. For convenience of description, inside of the memory card socket 100 in which the memory card 200 is mounted is projected and generally shown. The memory card 200 may be inserted in a main body 110 of the memory card socket 100 through an insertion portion 130 of the memory card socket 100. Referring to FIG. 8, in some embodiments, a plurality of terminals 251 and 252 (e.g., external conductive terminals for communicating between internal circuitry of the memory card 200 and an outside of the memory card 200) may be formed on a surface of the memory card 200, and the memory card socket 100 may include socket terminals 151 and 152 corresponding to the plurality of terminals 251 and 252 to allow for socket terminals 151 and 152 to be electrically connected to the plurality of terminals 251 and 252, respectively. Referring to FIG. 1A, in some embodiments, the electronic device 10 may read and write data to and from the memory card 200 via the plurality of terminals 251 and 252 and the socket terminals 151 and 152.

Returning to FIG. 2A, a lock portion 120 may be formed on the memory card socket 100. The lock portion 120 may be positioned and configured to engage with a notch 220 formed on an edge of the memory card 200. In some embodiments, when the lock portion 120 is engaged with the notch 220 of the memory card 200, detaching of the memory card 200 may be prevented or inhibited. As such, the lock portion 120 may be referred to as a locking device, which may be in a locked state or an unlocked state.

The lock portion 120 may include a first element 120A (or first component), a second element 120B (or second component), and a rotary shaft 120C. In certain embodiments, the first element 120A may be configured to move by a predetermined angle and/or in a predetermined direction about the rotary shaft 120C. The first element 120A may be moved by, for example, an elastic body or the like.

Generally, the lock portion 120 may check whether the memory card 200 is mounted correctly in the memory card socket 100, and may prevent the memory card 200 from being isolated from the memory card socket 100 due to, for example, external shocks or abrupt jostling applied to the electronic device 10 during use or operation of the electronic, device 10.

In some embodiments, the lock portion 120 may include the first element 120A that may control attaching and detaching of the memory card 200, and the second element 120B that may be controlled according to the software. For example, the first element 120A may prevent the memory card 200 from being isolated from the memory card socket 100, and the second element 120B may be designed or configured to control movement of the first element 120A according to commands from the software. In certain embodiments, the software may be installed on the controller 300, while in other embodiments, the software may be installed elsewhere. This will be described in detail with reference to FIG. 2C.

When the lock portion 120 receives an unlock command from the software, the lock portion 120 may move freely, and the memory card 200 may be inserted to or removed from the memory card socket 100 according to user's intention. As shown in FIG. 2a, a direction in which the memory card 200 is inserted in the memory card socket 100 is denoted by an arrow. In embodiments where the lock portion 120 has received an unlock command, the electronic device 10 may not be performing operations involving the memory card 200, such as, for example, a read/write of data to/from memory card 200 or executing a programs, such as the OS, on the memory card 200. Therefore, in some embodiments, when the memory card 200 is removed from the memory card socket 100, the electronic device 10 may not be affected.

Referring to FIG. 2B, exemplary embodiments of the memory card 200 and the memory card socket 100 forming the data processing apparatus 1000 are shown. For convenience of description, inside of the memory card socket 100 in which the memory card 200 is mounted is projected and generally shown.

The lock portion 120 of the memory card socket 100 may include the first element 120A controlling the attaching and detaching of the memory card 200, and the second element 120B controlled by the software, as described above in connection with FIG. 2A. The first element 120A and the second element 120B may be physically and/or communicatively coupled to each other. If a recess is formed in a part of the first element 120A and the second element 120B is engaged with the recess of the first element 120A, the first element 120A may be maintained in a fixed state. In some embodiments, when the first element 120A is in a fixed state, the first elements 120A may not be moveable and, therefore, may be configured to prevent or inhibit the memory card 200 from being removed.

In some embodiments, the second element 120B may move back and forth in the direction of inserting the memory card 200 (i.e., up and down perpendicularly to the inserting direction of the memory card 200), thereby allowing the second element 120B to be inserted into or removed from the recess of the first element 120A.

Thus, in certain embodiments, when the second element 120B is inserted into the first element 120A according to a lock command instruction, the lock portion 120 may be maintained in a locked state. As a result, there may be a reduced ability to physically isolate the memory card 200 from the memory card socket 100 with a normal operation, and the electronic device 10 may be enabled to perform operations involving the memory card 200, such as, for example, a read/write of data to/from the memory card 200 or executing programs such as the OS on the memory card 200. In embodiments where the memory card 200 is not removed from the memory card socket 100 according to the user's intention or according to the necessity, the electronic device 10 may use the memory card 200 as a memory device for the same or similar purpose as that of the embedded memory 400.

FIG. 2C shows an expanded view of the lock portion 120 of the memory card socket 100, consistent with certain disclosed embodiments. The lock portion 120 may include the first element 120A, the second element 120B, and the rotary shaft 120C. The first element 120A may be engaged with the notch 220 on the edge of the memory card 200 or directly with the edge of the memory card 200 to prevent the memory card 200 from detaching from the memory card socket 100. The second element 120B may be physically coupled or connected to the first element 120A when the lock portion 120 is locked according to the lock command instruction, and may be separated or uncoupled from the first element 120A when the lock portion 120 is unlocked. In some embodiments, the first element 120A may include the rotary shaft 120C. The rotary shaft 120C may guide or control the first element 120A, such that the first element 120A moves in a constant direction. The constant direction may be, for example, a horizontal direction, a vertical direction, an arced direction toward and away from the memory card 200, etc. The first element 120A may be designed to move in the constant direction when receiving a force or pressure from, for example, an elastic body or the like. In some embodiments, the lock portion 120 may be located near an edge of the insertion portion 130 of the memory card socket 100.

In certain embodiments, the software configured to control a part of the data processing apparatus 1000 may be further configured to control the second element 120B. Moreover, in some embodiments, the second element 120B may be moved by an actuator (not shown).

Figure 3A:
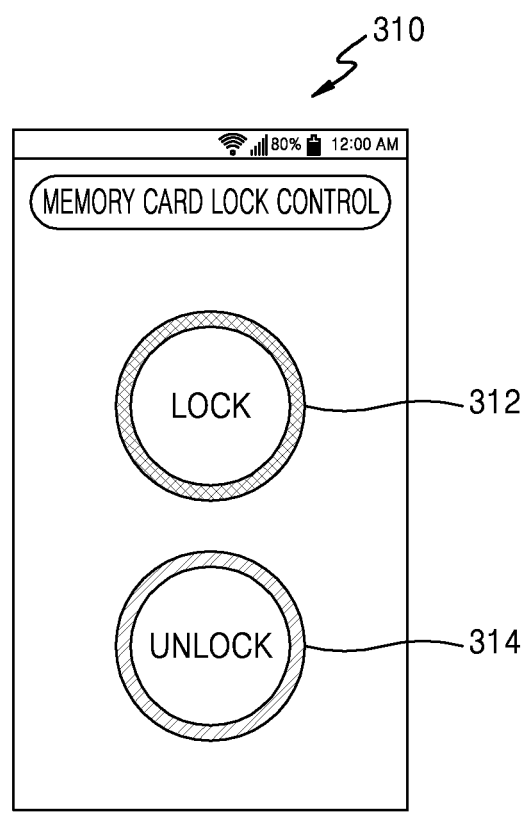
FIGS. 3A, 3B, and 3C are graphic representations illustrating example screens in data processing apparatus according to certain exemplary embodiments.
Figure 3B:
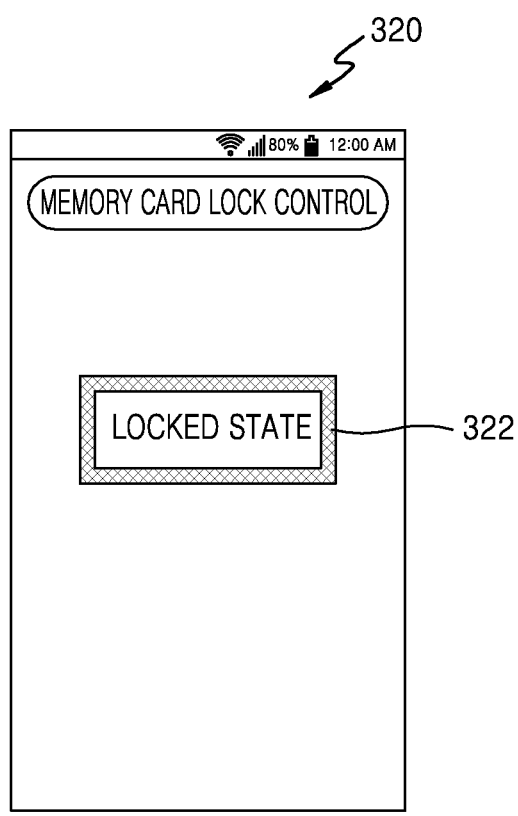
Figure 3C:
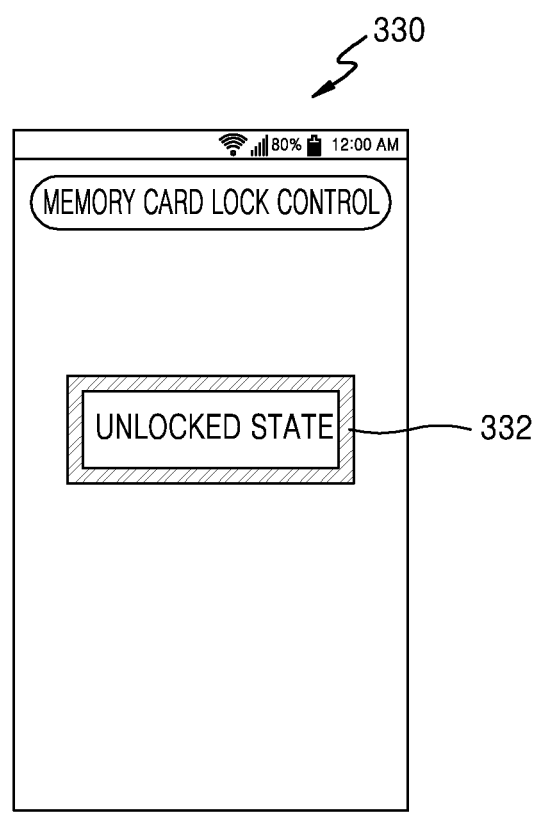

FIGS. 3A, 3B, and 3C are graphic representations illustrating example screen shots of a data processing apparatus according to some exemplary embodiments.

FIG. 3A shows an illustrative main screen 310 displaying a status of the software controlling a lock portion 120 of a memory card socket 100 in the data processing apparatus 1000. In some embodiments, the software may include instructions that, when executed by one or more processors or CPUs, may control the controller 300 of the electronic device 10. In some exemplary embodiments, such as when the electronic device 10 is a smart phone, the software may be a mobile application installed on and executed by one or more components of the smartphone. The software may be configured to control, store, retrieve, transmit, execute or act upon various pieces of information related to the electronic device 10. In the example embodiment of FIG. 3A, when the software instructions are being executed, the main screen 310 of an electronic device 10 may present or display to the user a lock command icon 312 and an unlock command icon 314. If the electronic device 10 includes a touchscreen, such as, for example, touchscreens found in smartphones, computing devices, vehicle displays, etc., the lock command icon 312 and the unlock command icon 314 may be touched by a finger or the like to cause the electronic device 10 to execute the command and/or instructions associated with the respective the lock command icon 312 and the unlock command icon 314. If the electronic device 10 includes an auxiliary input device (e.g., keyboard, microphone, mouse, etc.), the lock command icon 312 and the unlock command icon 314 may be selected (e.g., mouse click, keyboard shortcuts or arrows, voice recognition) to cause the electronic device 10 to execute the command and/or instructions associated with the respective the lock command icon 312 and the unlock command icon 314.

In some embodiments, the lock command icon 312 and the unlock command icon 314 may be arranged in parallel or arranged diagonally on the main screen 310. The lock command icon 312 and the unlock command icon 314 may be of a different color or different color combinations from each other for improving visibility. Additionally or alternatively, the lock command icon 312 and the unlock command icon 314 may have different patterns from each other for improving visibility. The lock command icon 312 and the unlock command icon 314 may include identifiable language (e.g., "lock," "unlock," etc.) or symbols (e.g., an open lock symbol, a closed lock symbol, etc.).

FIG. 3B shows an illustrative locked state Screen 320 displayed on a screen of an exemplary electronic device 10 in order to notify the user of the current state. FIG. 3B represents embodiments in which the user touches or clicks the lock command icon 312 on the main screen 310. In some embodiments, a locked state display 322 displayed on the locked state screen 320 may have the same color, combination of colors, and/or patterns as that of the lock command icon 312 so that the user may intuitively recognize the state of the data processing apparatus 1000. In certain embodiments, an audio or visual alarm, alert or other notification, a vibration, or a voice notifying the user of the locked state may be provided on or through the locked state screen 320, as well as the locked state display 322, according to a setting of the user. After displaying the locked state screen 320 on the screen of the electronic device 10 for a predetermined time period, the software that is executing may be automatically terminated or manually terminated by the user. When the locked state screen 320 is displayed on the screen of the electronic device 10, the lock portion 120 of the memory card socket 100 may be locked. When the lock portion 120 has been in the locked state, the locked state may be maintained continuously, and if the lock portion 120 has been in an unlocked state, the lock portion 120 may be switched to the locked state.

As illustrated above with reference to FIG. 2C, when the lock command is issued the locked state screen 320 may be displayed on the screen of the electronic device 10, and the second element 120B of the lock portion 120 may be coupled to the first element 120A. As shown in FIG. 1A, since the memory card socket 100 mounted in the electronic device 10 may be installed on the electronic device 10, it may be difficult for the user to check the operating state of the memory card socket 100 without separating a cover of the electronic device 10. Therefore, it may be beneficial to notify the user of the current operating state of the memory card socket 100. For example, an audio or visual alarm, alert or other notification, a vibration, or a voice may be used to notify the user of the locked state. In some embodiments, a visual notification may be displayed on the screen of the electronic device 10. By providing the locked state screen 320 to the user, for example, the user may identify the current operating state of the data processing apparatus so as not to forcibly or unintentionally remove the memory card 200 from the memory card socket 100 when the memory card 200 is in use.

FIG. 3C shows an unlocked state screen 330 that may be displayed on the screen of the electronic device 10 to notify the user of the current state. In some embodiments, the unlocked state screen 330 may be displayed when the user touches or clicks the unlock command icon 314 on the main screen 310 of the electronic device 10. The unlocked state screen 330 may be generated by software executing on electronic device 10 or memory card 200 in response to, for example, the user touching or clicking on the unlock command icon 314. An unlocked state display 332 shown on the unlocked state screen 330 may have the same color, the same color combinations, or the same pattern as that of the unlock command icon 314 so that the user may intuitively recognize the state of the data processing apparatus. In some embodiments, an audio or visual alarm, alert or other notification, a vibration, or a voice may be used to notify the user of the unlocked state may be provided on or through, for example, the unlocked state screen 330, as well as the unlocked state display 332, according to a setting of the user. In certain embodiments, the audio or visual alarm, alert or other notification, the vibration, or the voice provided in connection with the unlocked stated may be different from the audio or visual alarm, alert or other notification, the vibration, or the voice provided in connection with the locked state. In some embodiments, after outputting and displaying the unlocked state screen 330 for a period of time on the screen of the smartphone, the software executing on electronic device 10 and/or memory card 200 may be automatically terminated or manually terminated by the user. Referring to FIG. 1B, in some embodiments, if the user touches or clicks the unlock command icon 314 on the screen of the smartphone, the data on the memory card 200 may be transferred to the embedded memory 400 or the auxiliary memory card 200S. When the transfer of the data from memory card 200 is finished, the unlocked state screen 330 may be displayed on the screen of the electronic device 10, and correspondingly, the lock portion 120 of the memory card socket 100 may be unlocked. If the lock portion 120 has been in the unlocked state, the unlocked state may be maintained, and if the lock portion 120 has been in the locked state, the lock portion 120 may be switched to the unlocked state.

As illustrated above with reference to FIG. 2C, when the unlock command is issued and the unlocked state screen 330 may be displayed on the screen of the electronic device 10, the second element 120B of the lock portion 120 may be separated or uncoupled from the first element 120A, In the unlocked state, the electronic device 10 may not perform the read or write operation of important data and programs, such as the OS, on the memory card 200 before switching to the locked state again.

Figure 4A:
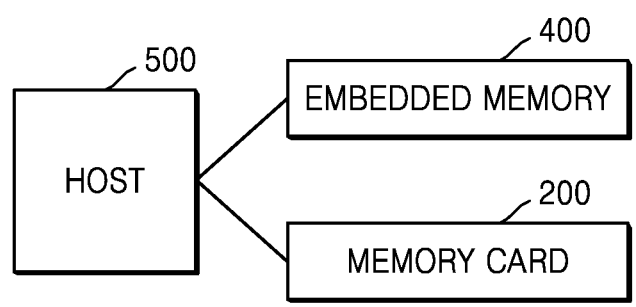
FIGS. 4A, 4B, and 4C are schematic diagrams of a host and a memory of an electronic device including a data processing apparatus according to certain exemplary embodiments.
Figure 4B:
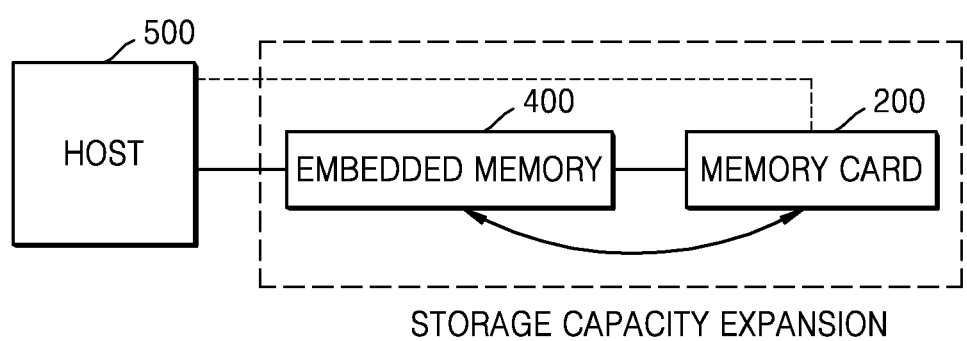
Figure 4C:
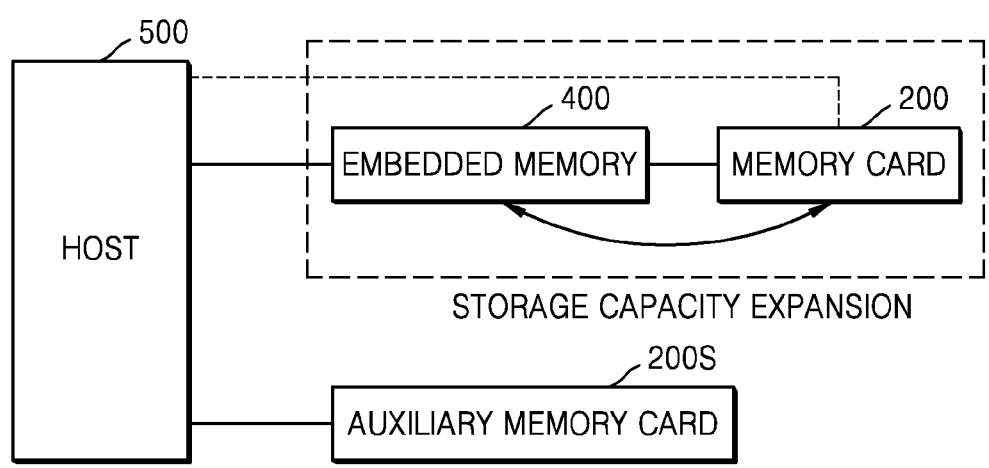

FIGS. 4A, 4B, and 4C are schematic diagrams of a host 500 and memory cards 200, 200S, and 400 of the electronic device including the data processing apparatus according to some exemplary embodiments.

FIG. 4A shows the host 500 and the memory cards 200 and 400. The host 500 may arrange the embedded memory 400 and the memory card 200 in parallel with each other so as to cause the embedded memory card 400 to store the important data and the program controlling the electronic device 10, such as the OS, and the memory card 400 to store programs and data having relatively lower importance. In this case, for example, when the memory card 200 is unexpectedly isolated from the memory card socket 100, the effects to the electronic device 10 may be minimized. In some embodiment however, the storage capacity of the embedded memory card 400 may not be expanded, and the different kinds of OSs that may be realized in the electronic device 10 may be limited.

FIG. 4B shows the host 500 and the memory card 200 and 400 of the electronic device including the data processing apparatus according to some exemplary embodiments. As illustrated in FIG. 4B, in some embodiments, the host 500 may arrange the embedded memory card 400 and the memory card 200 in series, so as to cause both the embedded memory card 400 and the memory card 200 to store the programs controlling the electronic device 10, such as the OS, and the other important data, and the memory card 200 to store the programs and data having relatively lower importance. In some embodiments, such as the embodiment illustrated in FIG. 1A, if the memory card 200 is unexpectedly isolated from the memory card socket 100, the electronic device 10 may be affected. Although the embedded memory card 400 may not be able to expand its storage capacity, the storage capacity available to the electronic device 10 may be expanded by using the memory card 200. In addition, an OS that is different from the OS installed on the embedded memory card 400 may be installed on the memory card 200 so that two kinds of OSs may operate in the electronic device 10. Further, in some embodiments, because the embedded memory 400 and the memory card 200 communicate with each other and the host 500 and the memory card 200 communicate with each other, a data processing speed may be improved.

In certain embodiments, the electronic device 10 may recognize the memory card 200 and the embedded memory 400, which may be two separate storage spaces physically, as one combined storage space logically. In other embodiments, the electronic device 10 may recognize the memory card 200 and the embedded memory 400, that are physically separate two storage spaces, logically as a first storage space, including the embedded memory 400 and some of the storage space of the memory card 200, and a second storage space, including the remaining storage space of the memory card 200.

FIG. 4C shows the host 500 and the memory devices (i.e., memory device 200, memory device 200S, and memory device 400) of the electronic device including the data processing apparatus according to some exemplary embodiments. In some embodiments, the host 500 may arrange the embedded memory 400 and the memory card 200 in series so as to command both the embedded memory 400 and the memory card 200 to store software or instructions that control the electronic device 20 such as the OS and important data, and cause the auxiliary memory card 200S to store programs and data that may have relatively lower importance. Although the physical storage capacity of the embedded memory 400 may not be expanded, the storage capacity may be expanded logically by using the memory card 200. In addition, in some embodiments, a different kind of OS may be installed on the memory card 200 from the OS installed on the embedded memory 400 so that two kinds of OSs may operate in the electronic device 20. Also, the host 500 may command the auxiliary memory card 200S to store programs and data having relatively lower importance.

Figure 5A:
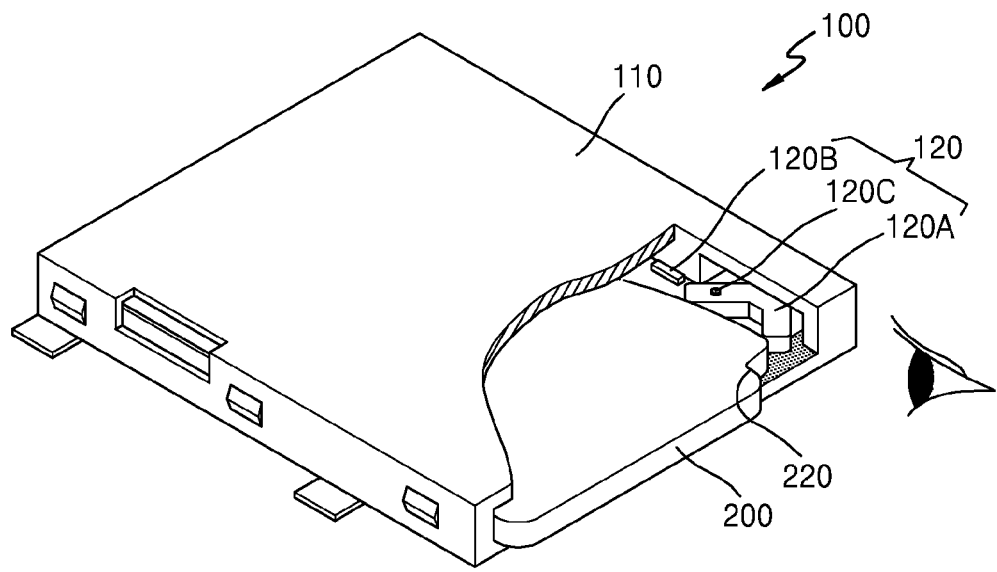
FIGS. 5A and 5B are respectively a cut perspective view and a plan perspective view of a data processing apparatus according to certain exemplary embodiments.
Figure 5A:
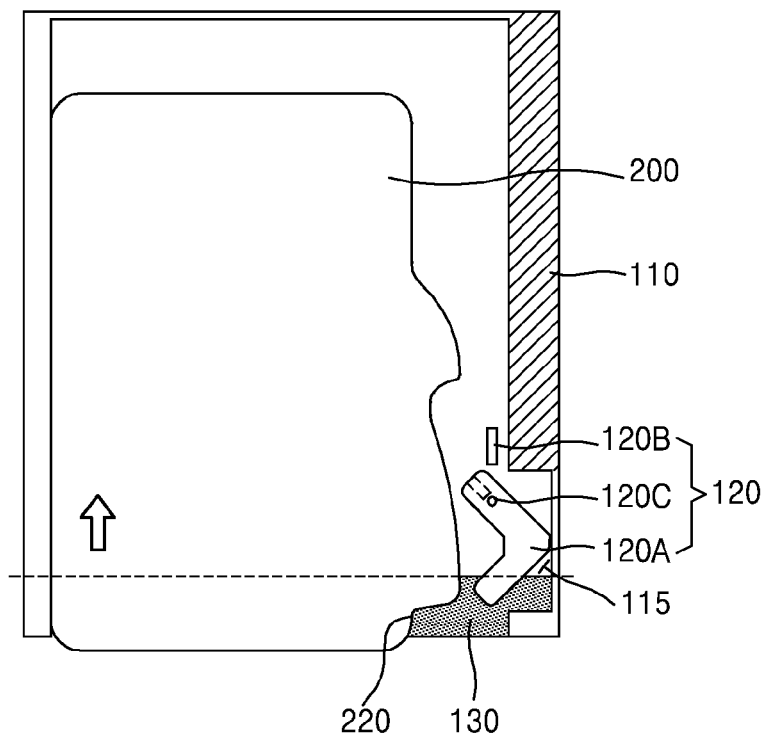
Figure 5B:
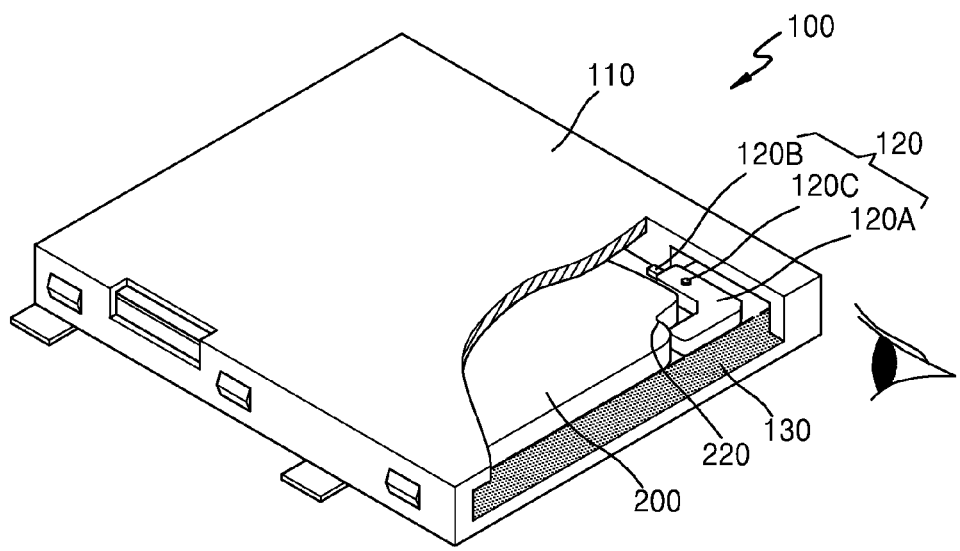
Figure 5B:
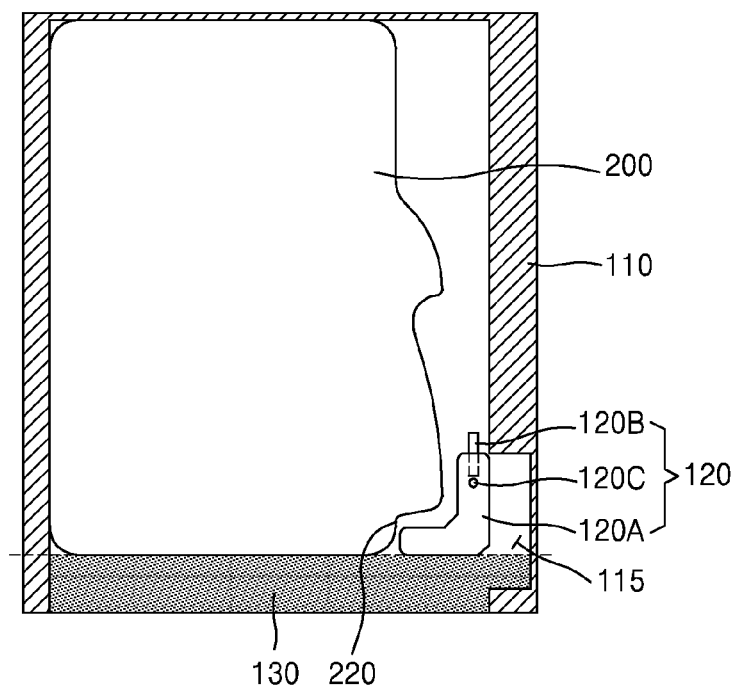

FIGS. 5A and 5B are a cut perspective view and a plan perspective view, respectively, of a data processing apparatus according to some exemplary embodiments.

FIG. 5A shows an example process of inserting the memory card 200 into the main body 110 via the insertion portion 130 of the memory card socket 100. In order to insert the memory card 200 into the main body 110 via the insertion portion 130 of the memory card socket 100, in some embodiments, the data processing apparatus 1000 may be in an unlocked state. When the data processing apparatus 1000 is in the unlocked state, the first element 120A and the second element 120B of the lock portion 120 may not be connected or coupled to each other, and thus, the first element 120A may rotate by a predetermined angle about the rotary shaft 120C. A surface of the main body 110, on which the lock portion 120 is located, may have a recess 115 for accommodating the first element 120A that is rotating. Therefore, in some embodiments, even when the first element 120A rotates, the first element 120A may be configured such that it does not protrude out of the memory card socket 100, and a radius of the rotation of the first element 120A may be within a predetermined angle range.

In some embodiments, when the data processing apparatus is in an unlocked state, the memory card 200 may be inserted into the memory card socket 100. At least one surface of the insertion portion 130 may have a different appearance from that of the main body 110 (e.g., a different color, a different set of colors, different pattern, etc.). In some embodiments, the appearance (e.g., color(s), pattern(s), etc.) of the insertion portion 130 may be highly visible, and may be complementary with the appearance of the main body 110 of the memory card socket 100 and the appearance (e.g., color(s), pattern(s), etc.) of a main board of the electronic device 10 in which the memory card socket 100 is inserted and/or mounted. In certain embodiments, the appearance of the insertion portion 130 may allow for the user to intuitively recognize when the memory card 200 is not completely inserted and mounted in the memory card socket 100. For example, if the memory card 200 is not completely inserted in the main body 110, the insertion portion 130 may be hidden by a part of the memory card 200 so that the color(s) or pattern(s) of the insertion portion are not visible. In such embodiments, the user may be prevented from instructing, the software to move to the locked state. Therefore, there may be a reduction in errors of the memory card socket 100 and the electronic device 10 due to the execution of the lock command when the memory card 200 is not properly inserted or mounted.

The above process also may be applied to the process of removing the memory card 200 from the memory card socket 100, as well as the process of inserting the memory card 200 in the memory card socket 100.

FIG. 5B illustrates an embodiment in which the memory card 200 is completely inserted in the memory card socket 100. As illustrated above with reference to FIG. 5A, in some embodiments, when the memory card 200 is inserted in the main body 110 via the insertion portion 130 of the memory card socket 100, the insertion portion 130 may be hidden by a part of the memory card 200 and the color(s) or pattern(s) of the insertion portion 130 may not be seen. However, as shown in FIG. 5B, in embodiments in which the memory card 200 is completely inserted into the main body 110 of the memory card socket 100 and mounted in the memory card socket 100, the edge of the memory card 200 or the notch 220 formed at the edge of the memory card 200 may be engaged with the lock portion 120 of the memory card socket 100, and the color(s) and pattern(s) of at least one surface of the insertion portion 130 may be completely visible. In some embodiments, the user may visibly identify whether the memory card 200 is fully inserted and mounted in the memory card socket 100 and whether the memory card 200 exists in the memory card socket 100, and thereby reduce the possibility of an unintentional or forcible removal of the memory card 200 from the memory card socket 100. In certain embodiments, when the memory card 200 is fully inserted and mounted in the memory card socket 100, the lock command may be executed automatically or manually by the user. When the memory card 120 is in the locked state, in some embodiments, the electronic device 10 may perform the read or write operation of relatively more important data or the OS on the memory card 200.

In some embodiments, at least one surface of the insertion portion 130 may be formed to project varying colors by using, for example, light emitting devices. The insertion portion 130 may be configured, in some embodiments, such that it emits light of varying colors, and the emitted colors may depend on whether or not the memory card 200 is inserted into the memory card socket 100. For example, if the memory card 200 is not fully inserted into the memory card socket 100, the light emitting device may emit blue light and may indicate a phrase such as "no card" or the like. As another example, if the memory card 200 is fully inserted and mounted in the memory card socket 100, the light emitting device may emit red light and may indicate a phrase such as "card exists" or the like. In some embodiments, the phrases (e.g., "no card", "card exists", etc.) may be displayed on a screen of the electronic device 10 or may be displayed via the light emitting, devices on the insertion portion 130. The light emitting devices may be independently controlled or may be controlled in association with the data processing apparatus 1000.

In some embodiments, the processes of inserting and coupling the memory card 200 to the memory card socket 100 and decoupling and removing the memory card 200 from the memory card socket 100 may include five stages. For example, the user may couple the memory card 200 to the memory card socket 100, the user may initiate the lock command and cause the electronic device to execute the lock command, the electronic device 10 may perform the read or write operations of relatively more important data and the OS on the memory card 200, the user may initiate the unlock command and cause the electronic device to execute the unlock command, and the user may remove the memory card 200 from the memory card socket 100.

An example process of inserting and coupling the memory card 200 to the memory card socket 100 may be as follows. When the user physically pushes the memory card 200 into the memory card socket 100 via the insertion portion 130, the electronic device 10 may recognize the memory card 200 and initiate the change to the lock command state. In some embodiments, the lock portion 120 of the memory card socket 100 may draw in or pull the memory card 200 so that the memory card 200 may be fully inserted into the main body 110 of the memory card socket 100, and the first element 120A may rotate such that it forms a hook that is fixed at a lower corner of the memory card 200. Then, the memory card 200 may be in the locked state such that the memory card 200 may not be physically unlocked. Therefore, in some embodiments, the locked state may be reached automatically after insertion of the memory card 200.

As described above, in some embodiments, the insertion portion 130 may have different colors or patterns from those of other elements or may include the light emitting devices so that the user may visibly identify when the memory card 200 is in the locked state. As such, the user may not unintentionally or forcibly remove the memory card 200 from the memory card socket 100 while it is in the locked state.

An example process of decoupling and removing the memory card 200 from the memory card socket 100 may be as follows. In some embodiments, the memory card 200 may be configured such that it may be prevented from being physically removed unless there is the unlock command from the electronic device 10. Thus, in some embodiments, the user may be provided with information related to the process for unlocking the memory card 200, and an improved ability to ensure reliability of the data stored on the memory card 200 and for terminating normally the system of the electronic device 10 before the unlock command is executed.

To issue the unlock command, in some embodiments, a memory card lock control application, may be used. For example, a memory card lock control application may begin the process of switching to the unlocked state when the user touches or clicks the unlock command icon 314, such as the unlock command icon displayed on electronic device 10 of FIG. 3A. After the memory card 200 is moved from inside of the memory card socket 100 to outside of the memory card socket 100, the user may pull the memory card 200 manually to remove the memory card 200 from the memory card socket 100 while unlocking the lock portion 120 at the lower corner of the memory card 200, thereby allowing the memory card 200 to enter the unlocked state. For example, the user may receive a message indicating the unlock process is finished via the alarm, alert or notification, the vibration, or the voice, and the user may remove the memory card 200 completely from the memory card socket 100 by, for example, pulling down a convex portion formed on a lower end of the memory card 200 or the lower end of the memory card 200.

As described above, since the insertion portion 130 may have different colors, patterns, or light emitting devices, the user may be notified visually of the unlocked state of the memory card 200. Thus, for example, errors that may occur when the user operates the electronic device 10 in the unlocked state may be minimized or prevented.

Figure 6:
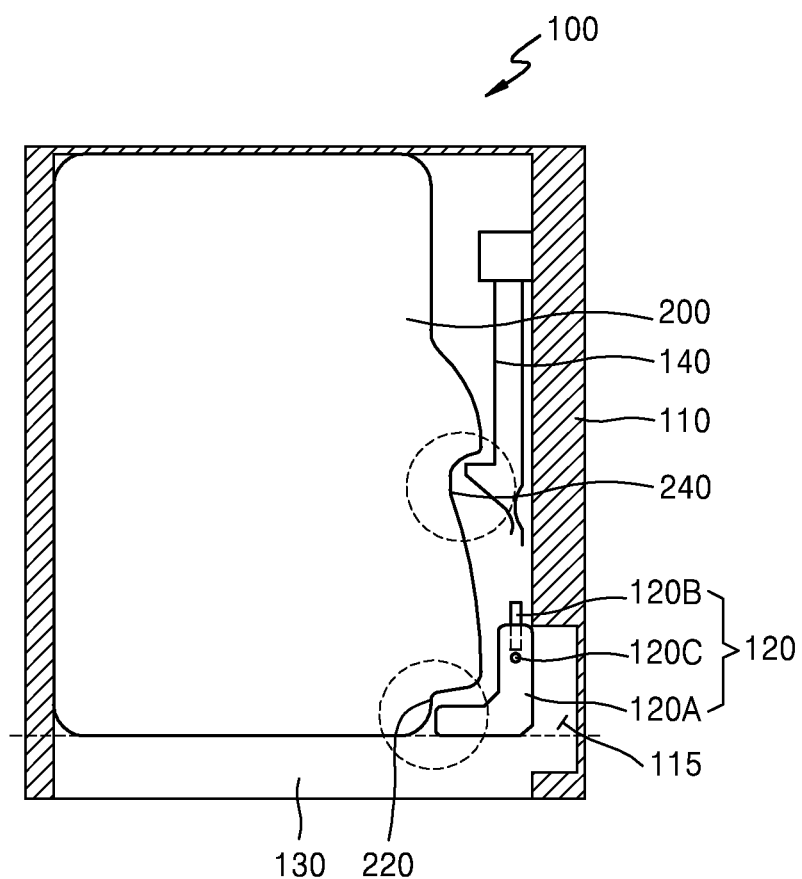
FIG. 6 is a plan perspective view of a data processing apparatus according to certain exemplary embodiments.

FIG. 6 is a plan perspective view of a data processing apparatus according to certain exemplary embodiments.

Referring to FIG. 6, in some embodiments, a latch unit 140 may be formed additionally on the main body 110 of the memory card socket 100. Although the latch unit 140 and the lock portion 120 are shown separately in FIG. 6, the latch unit 140 and the lock portion 120 may be formed, for example, as one elastic member. The memory card 200 may include a first notch 220 and a second notch 240 and the memory card socket 100 may include the lock portion 120 and the latch unit 140 so that the memory card 200 may be held or fixed in the memory card socket 100 via two portions. In some embodiments, the first notch 220 may be engaged with the lock portion 120 and the second notch 240 may be engaged with the latch unit 140, so that the memory card 200 may be firmly and stably inserted in the memory card socket 100 and mounted in the memory card socket 100.

In addition, in some embodiments, the lock portion 120 and the latch unit 140 may be formed on the same surface of the main body 110, or may be formed on different surfaces of the main body 110. Locations and shapes of the lock portion 120 and the latch unit 140 may be of varying designs depending on a shape and a standard of the memory card 200 within the scope of the disclosed embodiments. In some embodiments, the latch unit 140 may include an elastic member. For example, the latch unit 140 may be formed of the elastic member, or may partially include an elastic member therein.

Figure 7:
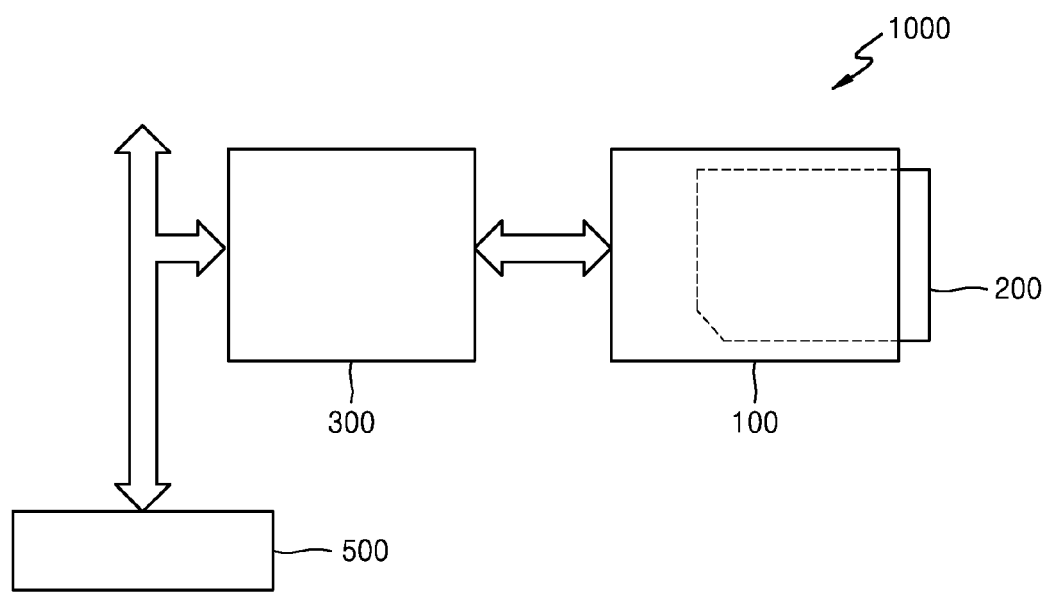
FIG. 7 is a schematic diagram of a system of a data processing apparatus according to certain exemplary embodiments.

FIG. 7 is a schematic view illustrating a system of the data processing apparatus 1000 according to certain exemplary embodiments.

Referring to FIG. 7, the system of the data processing apparatus 1000 may include the memory card socket 100, the memory card 200, the controller 300, and the host 500, such as those described above with reference to previous exemplary embodiments. The memory card socket 100 may be configured so that the memory card 200 may be inserted therein and may make contact with the memory card 200 and thereby to allow for the transfer of data to and from the memory card 200. For example, the memory card socket 100 may be electrically connected to the memory card 200. In some embodiments, the controller 300 may control data exchange with the memory card 200 via the memory card socket 100, and may control the locked state of the memory card socket 100. In certain embodiments, the controller 300 may be used also to store the data on the memory card 200. The controller 300 may, for example, be managed by the data processing apparatus 1000 and the software executing therein.

FIG. 8 is an example schematic diagram of the memory card socket 100, as disclosed above in connection with FIG. 7.

Referring to FIG. 8, in certain embodiments, the memory card socket 100 may be provided to allow for the memory card 200 to be inserted.

In some embodiments, the memory card socket 100 may include first row-corresponding socket terminals 151 corresponding to first row terminals 251 (e.g., external terminals) of the memory card 200, second row-corresponding socket terminals 152 corresponding to second row terminals 252 (e.g., external terminals) of the memory card 200, and the main body 110 accommodating the first row-corresponding socket terminals 151 and the second row-corresponding socket terminals 152.

Thus, for example, when the memory card 200 is inserted into the main body 110, the memory card 200 may contact the first row-corresponding socket terminals 151 and the second row-corresponding socket terminals 152.

The memory card socket 100 may be electrically connected to the controller 300, and power, signals, and/or data may be input to or output from the first row-corresponding socket terminals 151 and the second row-corresponding socket terminals 152.

A socket terminal may be included among the first row-corresponding socket terminals 151 and the second row-corresponding socket terminals 152. In some embodiments, the socket may be configured such that if a corresponding particular terminal of the inserted memory card 200 is a ground terminal, the memory card 200 may be recognized as a first card type, and if the corresponding particular terminal is a data terminal, the inserted memory card 200 may be recognized as a second card type. For example, based on the corresponding particular terminal, the first card type may be a universal flash storage (UFS) card, and the second card type may be a micro secure digital (SD) card. Examples of micro SD cards may include ultrahigh speed-1 (UHS-1) type or UHS-2 type.

The first row-corresponding socket terminals 151 may include several socket terminals so as to allow recognition of both the first and second card types. The second row-corresponding socket terminals 152 may also include socket terminals. In some embodiments, the number of second row-corresponding socket terminals 152 may be greater than that of the second row terminals 252, so as to allow recognition and use of different card types. The memory card socket 100 according to the disclosed embodiments, however, may not be limited to the number of the first and second row-corresponding socket terminals 151 and 152.

Figure 9:
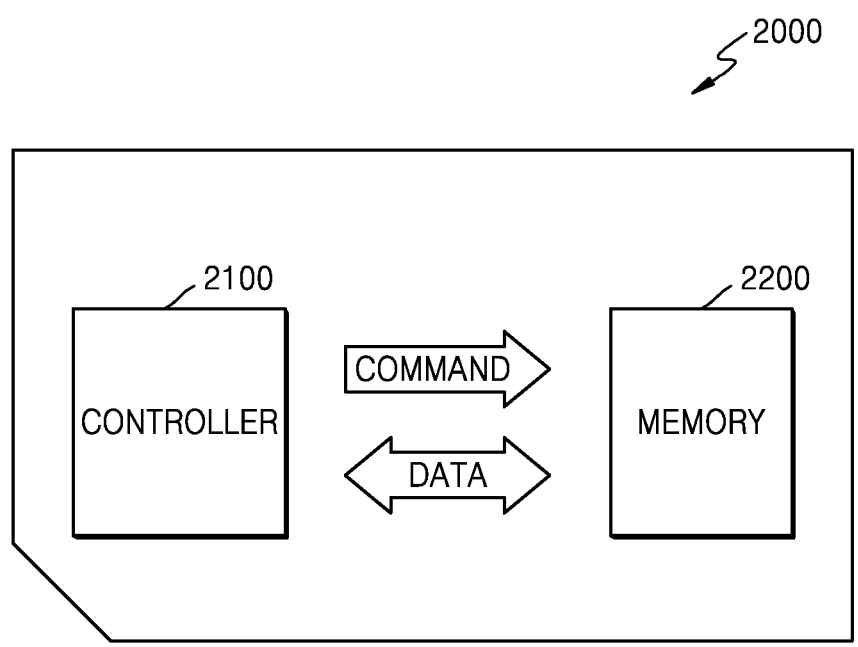
FIG. 9 is a schematic diagram of a memory card in a data processing apparatus according to certain exemplary embodiments.

FIG. 9 is a schematic diagram of a memory card 2000 in the data processing apparatus according to some exemplary embodiments.

In certain embodiments, a controller 2100 and a memory 2200 may be configured in the memory card 2000 to transmit and receive data and information. For example, if the controller 2100 gives a command, the memory 2200 may transmit data.

The memory card 2000 may be any of various memory cards such as a memory stick card, a smart media (SM) card, a secure digital (SD) card, a mini-SD card, a micro SD card, a multimedia card (MMC), a universal flash storage (ITS) card, etc.

Figure 10:
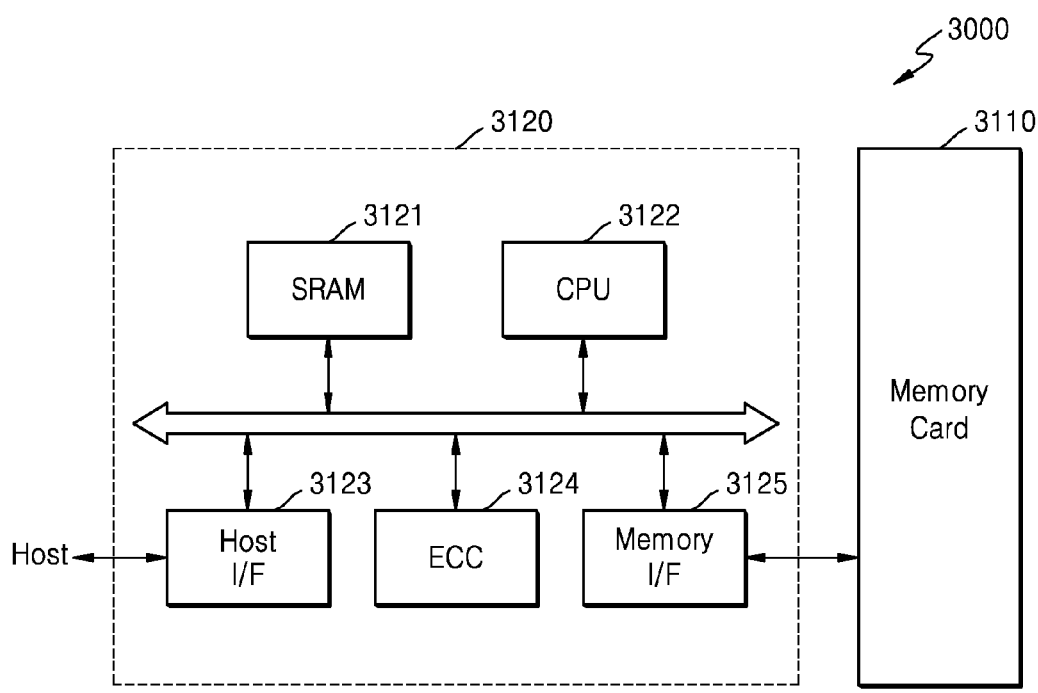
FIG. 10 is a block diagram of a data processing apparatus according to certain exemplary embodiments.

FIG. 10 is a block diagram of a data processing apparatus 3000 according to an exemplary embodiment.

Referring to FIG. 10, the data processing apparatus 3000 according to some exemplary embodiments may include a memory card 3110. The memory card 3110 may include a semiconductor memory device in another form (for example, a non-volatile memory device and/or an embedded memory). The data processing apparatus 3000 may include a memory controller 3120 that controls data exchange between a host and the memory card 3110.

The memory controller 3120 may include a processing unit 3122 that may be configured to control an overall operation of the data processing apparatus 3000. In some embodiments, the memory controller 3120 may include a static random access memory (SRAM) 3121 that may be used as an operation memory of the processing unit 3122. The memory controller 3120 may further include a host interface 3123 and a memory interface 3125. The host interface 3123 may include a data exchange protocol between the data processing apparatus 3000 and the host. The memory interface 3125 may connect the memory controller 3120 and the memory card 3110. Furthermore, the memory controller 3120 may further include an error correction code (ECC) block 3124. The ECC block 3124 may detect and correct an error of data read from the memory card 3110. Although not illustrated, the data processing apparatus 3000 may further include a read only memory (ROM) device that stores code data for interfacing with the host. In some embodiments, the data processing apparatus 3000 may also be implemented by a solid state drive (SSD) which may replace a hard disk of a computer system.

Figure 11:
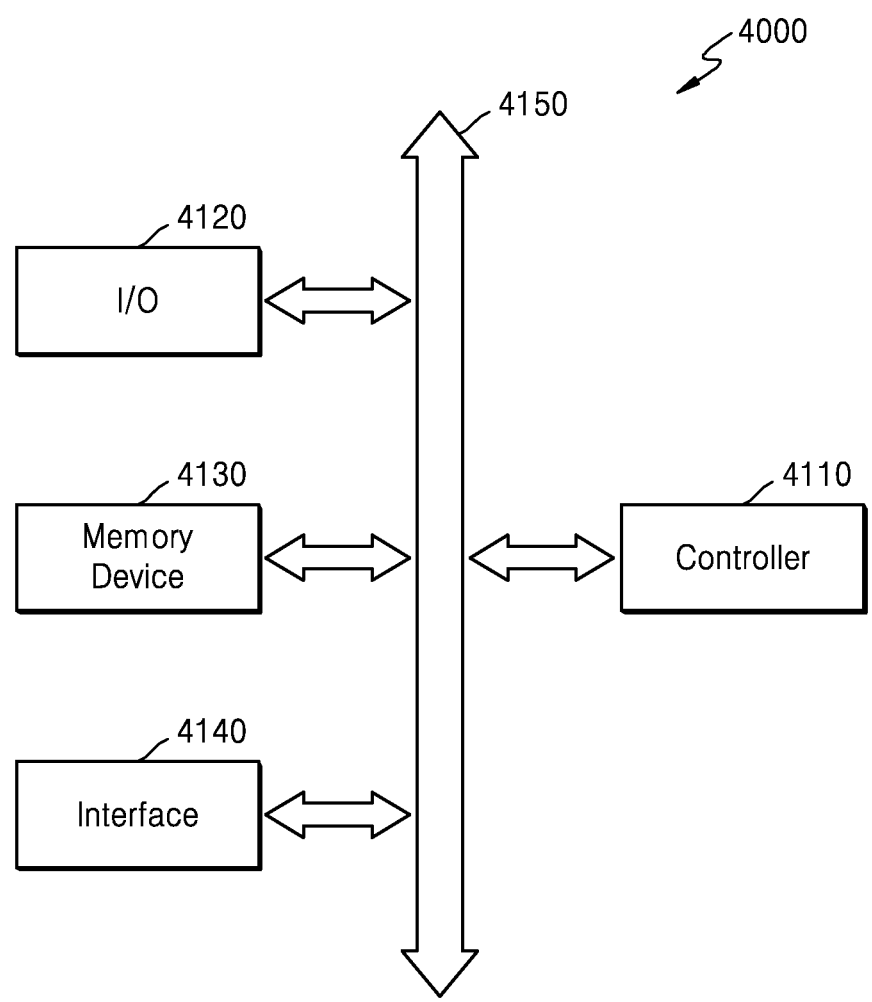
FIG. 11 is a block diagram of an electronic system including a data processing apparatus according to certain exemplary embodiments.

FIG. 11 is a block diagram illustrating an electronic system 4000 including a data processing apparatus according to certain exemplary embodiments.

Referring to FIG. 11, in some embodiments, the electronic system 4000 may include a controller 4110, an input/output (I/O) device 4120, a memory device 4130, an interface 4140, and a bus 4150. In some embodiments, the controller 4110, the I/O device 4120, the memory device 4130, and/or the interface 4140 may be physically and/or communicatively coupled to one another via the bus 4150. For example, the bus 4150 may correspond to a wired or wireless path through which data may be transmitted.

The controller 4110 may include at least one of a microprocessor, a digital signal processor, a microcontroller, and logic devices that may perform similar functions of these. The I/O device 4120 may include a mouse, a touch panel, a keypad, a keyboard, a display device or the like. The memory device 4130 may store data and/or commands. The memory device 4130 may include another type of semiconductor memory device, e.g., a non-volatile memory device and/or an embedded memory. In some embodiments, data may be transmitted to or received from a communication network (not shown) via the interface 4140. The interface 4140 may allow for wired or wireless transmission and reception. For example, the interface 4140 may include an antenna or a wired/wireless transceiver. Although not illustrated, the electronic system 4000 may further include, as an operation memory device to improve an operation of the controller 4110, a high-speed dynamic random access memory (DRAM) device and/or an SRAM device.

The electronic system 4000 may be applied to a personal digital assistant (PDA), a portable computer, a web tablet, a wireless phone, as mobile phone, a smart phone, a digital music player, or any electronic products that transmit and/or receive information in a wireless environment.

Figure 12:
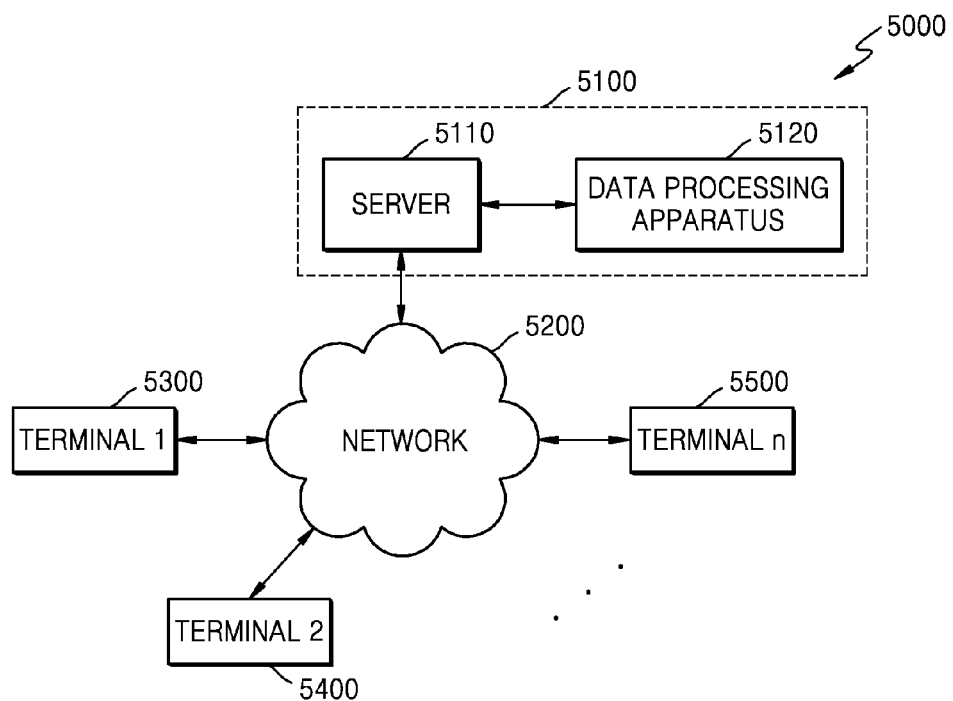
FIG. 12 is a block diagram of a network of a server system including a data processing apparatus according to certain exemplary embodiments.

FIG. 12 is a block diagram illustrating an implementation example of a network 5200 for a server system 5100 that includes a data processing apparatus according to certain exemplary embodiments.

Referring to FIG. 12, a network system 5000 according to some exemplary embodiments may include a server system 5100 and multiple terminals 5300, 5400, and 5500 that are connected via a network 5200. In some embodiments, the server system 5100 may include a server 5110 that processes requests received from the terminals 5300, 5400, and 5500 connected to the network 5200 and a data processing apparatus 5120 that stores data corresponding to the requests received from the terminals 5300, 5400, and 5500. The data processing apparatus 5120 may include, for example, any of the data processing apparatuses according to some exemplary embodiments, such as, for examples, those illustrated in FIGS. 1A to 6.

While the disclosed embodiments have been particularly shown and described with reference to exemplary embodiments thereof, it will be understood that various changes in form and details may be made therein without departing from the spirit and scope of the following claims.

What is claimed is:
1. A data processing apparatus comprising:
an electronic device configured to store data and instructions;
a memory card; and
a memory card socket into which the memory card is inserted, wherein the memory card socket comprises:
an insertion portion through which the memory card is inserted;
a lock portion formed around an edge of the insertion portion and that is configured to control attaching and detaching of the memory card based on the instructions received from the electronic device; and
a main body including the insertion portion and the lock portion and configured to accommodate the memory card via the insertion portion,
wherein at least one surface of the insertion portion includes at least one light emitting device, and the at least one light emitting device emits different colored light based on a lock command and an unlock command.

2. The data processing apparatus of claim 1, wherein when the electronic device issues the lock command, the lock portion is maintained in a locked state in which the memory card is not removable the memory card socket, and
when the electronic device issues the unlock command, the lock portion is maintained in an unlocked state in which the memory card is removable from the memory card socket.

3. The data processing apparatus of claim 2, wherein when the lock portion is in the unlocked state and the memory card is mounted in the main body via the insertion portion, the electronic device automatically causes the lock portion to be in the locked state.

4. The data processing apparatus of claim 1, wherein the lock portion comprises:
a first element configured to attach and detach the memory card; and
a second element controlled by the electronic device.

5. The data processing apparatus of claim 4, wherein when the electronic device issues the lock command, the second element couples with the first element, and when the electronic device issues the unlock command, the second element decouples from the first element.

6. The data processing apparatus of claim 5, wherein at least one surface of the insertion portion has at least one color that is different from at least one color of the main body.

7. The data processing apparatus of claim 1, wherein the memory card comprises a notch at an edge thereof, and the lock portion is configured to engage with the notch.

8. The date processing apparatus of claim 1, wherein data and instructions installed on the memory card include an operating system (OS) of the electronic device.

9. The data processing apparatus of claim 1, wherein the electronic device further comprises:
an embedded memory, wherein the memory card and the embedded memory are physically separated from each other, and the electronic device recognizes the memory card and the embedded memory logically as one storage space.

10. A memory card socket mounted in an electronic device that comprises a controller, the memory card socket comprising:
an insertion portion into which a memory card is inserted;
a lock portion formed around an edge of the insertion portion, wherein the controller controls attaching and detaching of the memory card by the lock portion; and
a main body including the insertion portion and the lock portion, wherein the main body accommodates the memory card via the insertion portion,
wherein the main body further comprises a latch unit, and the latch is engaged with a curved portion formed on the memory card.

11. The memory card socket of claim 10, wherein when the software issues a lock command, the lock portion is set in a locked state causing the memory card to remain fixed at a location so as not to be detached from the memory card socket, and when the controller executes an unlock command, the lock portion is set in an unlocked state causing the memory card to be removable from the memory card socket.

12. The memory card socket of claim 10, wherein the lock portion includes a rotary shaft and wherein the lock portion rotates within a predetermined angle range about the rotary shaft.

13. The memory card socket of claim 10, wherein the lock portion and the latch unit are formed on the same surface of the main body.

14. A data processing apparatus comprising:
an electronic device including at least one processor;
an embedded memory configured to store data and instructions;
a memory card;
a memory card socket,
wherein the memory card socket comprises:
an insertion portion through which the memory card is inserted; and
a lock portion formed around an edge of the insertion portion and that is configured to control attaching and detaching of the memory card based on instructions received from the electronic device,
wherein at least one surface of the insertion portion includes at least one light emitting device, and the at least one light emitting device emits different colored light based on a lock command and an unlock command.

15. The data processing apparatus of claim 14, wherein the lock portion comprises:
a first element configured to attach and detach the memory card; and
a second element controlled by the electronic device.

16. The data processing apparatus of claim 14, further comprising:
a main body including the insertion portion and the lock portion and accommodating the memory card via the insertion portion.

17. The data processing apparatus of claim 14, wherein the memory card and the embedded memory are two physical storage devices, and the electronic device recognizes the memory card and the embedded memory as one logical storage space.

18. The data processing apparatus of claim 14, wherein when the lock portion is in the unlocked state and the memory card is mounted in the main body via the insertion portion, the electronic device automatically causes the lock portion to change to the locked state.

* * * * *